US012497081B2

(12) United States Patent
Shi et al.

(10) Patent No.: US 12,497,081 B2
(45) Date of Patent: Dec. 16, 2025

(54) PEDESTRIAN BEHAVIOR PREDICTION WITH 3D HUMAN KEYPOINTS

(71) Applicant: Waymo LLC, Mountain View, CA (US)

(72) Inventors: Xinwei Shi, Cupertino, CA (US); Tian Lan, Sunnyvale, CA (US); Jonathan Chandler Stroud, Tempe, AZ (US); Zhishuai Zhang, Baltimore, MD (US); Junhua Mao, Palo Alto, CA (US); Jeonhyung Kang, San Jose, CA (US); Khaled Refaat, Mountain View, CA (US); Jiachen Li, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 345 days.

(21) Appl. No.: 17/988,701

(22) Filed: Nov. 16, 2022

(65) Prior Publication Data

US 2023/0150550 A1 May 18, 2023

Related U.S. Application Data

(60) Provisional application No. 63/280,063, filed on Nov. 16, 2021.

(51) Int. Cl.
*B60W 60/00* (2020.01)
*B60W 40/04* (2006.01)
(Continued)

(52) U.S. Cl.
CPC ...... *B60W 60/00274* (2020.02); *B60W 40/04* (2013.01); *B60W 50/0097* (2013.01);
(Continued)

(58) Field of Classification Search
CPC .......... B60W 60/00274; B60W 40/04; B60W 50/0097; B60W 60/0015;
(Continued)

(56) References Cited

U.S. PATENT DOCUMENTS

2014/0328519 A1* 11/2014 Martinetz ............... G06T 7/251
382/107
2020/0320719 A1* 10/2020 Lee .......................... G06T 7/20
(Continued)

FOREIGN PATENT DOCUMENTS

CN     113256681     8/2021

OTHER PUBLICATIONS

Chen et al., "A simple framework for contrastive learning of visual representations," Proceedings of the 37th International Conference on Machine Learning, 2020, 119:1597-1607.
Extended European Search Report in European Appln. No. 22207753.9, dated Apr. 13, 2023, 12 pages.
Gao et al., "Vectornet: En-coding hd maps and agent dynamics from vectorized representation," Proceedings of the IEEE/CVF Conference on Computer Vision and Pattern Recognition (CVPR), 2020, pp. 11525-11533.
(Continued)

*Primary Examiner* — Jason Holloway
*Assistant Examiner* — Madison B Emmett
(74) *Attorney, Agent, or Firm* — Fish & Richardson P.C.

(57) ABSTRACT

Methods, systems, and apparatus, including computer programs encoded on computer storage media, for agent behavior prediction using keypoint data. One of the methods includes obtaining data characterizing a scene in an environment, the data comprising: (i) context data comprising data characterizing historical trajectories of a plurality of agents up to the current time point; and (ii) keypoint data for a target agent; processing the context data using a context data encoder neural network to generate a context embedding for the target agent; processing the keypoint data using a keypoint encoder neural network to generate a keypoint embedding for the target agent; generating a combined embedding for the target agent from the context embedding and the keypoint embedding; and processing the combined
(Continued)

embedding using a decoder neural network to generate a behavior prediction output for the target agent that characterizes predicted behavior of the target agent after the current time point.

20 Claims, 4 Drawing Sheets

(51) Int. Cl.
  *B60W 50/00* (2006.01)
  *G06N 3/049* (2023.01)
  *G06N 3/08* (2023.01)
(52) U.S. Cl.
  CPC ......... *B60W 60/0015* (2020.02); *G06N 3/049* (2013.01); *G06N 3/08* (2013.01); *B60W 2554/4029* (2020.02); *B60W 2554/4045* (2020.02); *B60W 2554/4046* (2020.02); *B60W 2554/408* (2020.02); *B60W 2556/10* (2020.02)
(58) Field of Classification Search
  CPC . B60W 2554/4029; B60W 2554/4045; B60W 2554/4046; B60W 2554/408; B60W 2556/10; G06N 3/049; G06N 3/08; G06V 10/82; G06V 40/25; G06V 20/58
  See application file for complete search history.

(56) References Cited

U.S. PATENT DOCUMENTS

| | | | |
|---|---|---|---|
| 2021/0019619 A1* | 1/2021 | Bhattacharyya | G06N 3/0455 |
| 2022/0308581 A1* | 9/2022 | Ma | G06N 3/047 |
| 2023/0081247 A1* | 3/2023 | Malla | G06V 10/82 |
| | | | 382/107 |

OTHER PUBLICATIONS

Liang et al., "Peeking into the Future: Predicting Future Person Activities and Locations in Videos," CoRR, Feb. 11, 2019, arXiv:1902.03748v3, 13 pages.

Ngiam et al., "Scene Transformer: A unified architecture for predicting multiple agent trajectories," CoRR, Oct. 6, 2021, arXiv:2106.08417v2, 24 pages.

Palli-Thazha et al., "Trajectory Prediction of Traffic Agents: Incorporating Context Machine Learning Approaches," 2020 IEEE 91st Vehicular Technology Conference, May 25, 2020, pp. 1-6.

Quan et al., "Holitic LSTM for Pedestrian Trajectory Prediction," IEEE Transactions on Image Processing, Feb. 23, 2021, 30:3229-3239.

Sun et al., "Scalability in perception for autonomous driving: Waymo open dataset," Proceedings of the IEEE/CVF Conference on Computer Vision and Pattern Recognition, 2020, pp. 2446-2454.

Yan et al., "Spatial Temporal Graph Convolutional Networks for Skeleton-Based Action Recognition," (2018): Thirty-Second AAAI Conference on Artificial Intelligence, Apr. 27, 2018, 32(1):7444-7452.

Yau et al., "Graph-sim: A graph-based spatiotemporal interaction modelling for pedestrian ac-tion prediction," 2021 IEEE International Conference on Robotics and Automation (ICRA), May 30, 2021, pp. 8580-8586.

Zhang et al., "Pedestrian Crossing Intention Prediction at Red-Light Using Pose Estimation," IEEE Transactions on Intelligent Transportation Systems, May 4, 2021, 23(3):2331-2339.

Zhao et al., "TNT: Target-driven trajectory prediction," Proceedings of the 2020 Conference on Robot Learning, 2021, 155:895-904.

Zheng et al., "Multi-modal 3D Human Pose Estimation with 2D Weak Supervision in Autonomous Driving," Proceedings of the IEEE/CVF Conference on Computer Vision and Pattern Recognition (CVPR) Workshops, 2022, pp. 4478-4487.

* cited by examiner

PEDESTRIAN BEHAVIOR PREDICTION WITH 3D HUMAN KEYPOINTS

CROSS-REFERENCE TO RELATED APPLICATION

This application claims priority to U.S. Provisional Application No. 63/280,063, filed on Nov. 16, 2021. The disclosure of the prior application is considered part of and is incorporated by reference in the disclosure of this application.

BACKGROUND

This specification relates to predicting the future behavior of an agent in an environment.

The environment may be a real-world environment, and the agent may be, e.g., an agent in the vicinity of an autonomous vehicle navigating through the environment.

Autonomous vehicles include self-driving cars, boats, and aircraft. Autonomous vehicles use a variety of on-board sensors and computer systems to detect nearby objects and use such detections to make control and navigation decisions.

SUMMARY

This specification generally describes a system implemented as computer programs on one or more computers in one or more locations that generates behavior predictions for one or more target agents, e.g., pedestrians, cyclists, scooter riders, or other humans, in an environment.

Each behavior prediction is a prediction of the behavior of the target agent starting from a current time point.

In some implementations, the behavior prediction includes (i) a crossing action prediction, (ii) a trajectory prediction, or (iii) both.

A crossing action prediction is a score that represents the likelihood that the target agent is currently crossing a roadway in the environment, i.e., performing a crossing action.

A trajectory prediction is a prediction that defines the future trajectory of the corresponding target agent starting from a current time point.

For example, after training, the system can be used to make behavior predictions by an on-board computer system of an autonomous vehicle navigating through the environment and the target agents may be agents that have been detected by the sensors of the autonomous vehicle. An autonomous vehicle can be a fully-autonomous vehicle that makes autonomous driving decisions or a semi-autonomous vehicle that makes driving suggestions to a human operator. The behavior predictions can then be used by the on-board system to control the autonomous vehicle, i.e., to plan the future motion of the vehicle based in part on the likely future motion of other agents in the environment.

As another example, after training, the system can be used to make behavior predictions in a computer simulation of a real-world environment being navigated through by a simulated autonomous vehicle and the target agents. Generating these predictions in simulation may assist in controlling the simulated vehicle, in testing the realism of certain situations encountered in the simulation, and in ensuring that the simulation includes surprising interactions that are likely to be encountered in the real-world. More generally, generating these predictions in simulation can be part of testing the control software of a real-world autonomous vehicle before the software is deployed on-board the autonomous vehicle, of training one or more machine learning models that will later be deployed on-board the autonomous vehicle or both.

As used in this specification, a future trajectory for an agent is a sequence that includes a respective agent state for the agent for each of a plurality of future time points, i.e., time points that are after the current time point at which the trajectory prediction is made. Each agent state identifies at least a waypoint location for the corresponding time point, i.e., identifies a location of the agent at the corresponding time point. In some implementations, each agent state also includes other information about the state of the agent at the corresponding time point, e.g., the predicted heading of the agent at the corresponding time point.

An embedding of a given input, as used in this specification, is an ordered collection of numeric values, e.g., a vector of floating point or other numeric values.

The subject matter described in this specification can be implemented in particular embodiments so as to realize one or more of the following advantages. Accurate understanding and prediction of human behaviors are important for autonomous vehicles, especially in highly dynamic and interactive scenarios such as intersections in dense urban areas.

Accordingly, this specification describes techniques for accurately predicting the future behavior of pedestrians or other agents, e.g., cyclists, scooter riders, and so on. For example, the techniques described in this specification can accurately identify crossing agents, accurately predict their future trajectories, or both. For these tasks, the system makes use of not only the context information of road geometry and other traffic participants, but also need fine-grained information of the human pose, motion and activity, which the system infers from human keypoints. That is, the system incorporates human keypoints, e.g., 3D human keypoints, into the prediction in order to provide the fine-grained information needed to accurately predict the behavior of these agents. As a particular example, the described system can implement a multi-task learning framework to perform both pedestrian crossing action recognition and trajectory prediction in parallel by using 3D human keypoints extracted from sensor data to capture rich information on human pose and activity. This specification also describes two auxiliary tasks and contrastive learning to enable auxiliary supervisions to improve the learned keypoints representation, which further enhances the performance of behavior prediction tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as a "behavior prediction system," to generate a respective behavior prediction for each of one or more surrounding agents in the vicinity of the vehicle in an environment. Each surrounding agent can be, e.g., a pedestrian, cyclist, scooter rider, or other human. An agent can be referred to as being within the "vicinity" of the vehicle if the agent is within sensing range of at least one of the sensors of the vehicle.

This specification also describes how training examples generated by vehicles or other sources can be used to effectively train the behavior prediction system to accurately and reliably make predictions.

Figure 1:
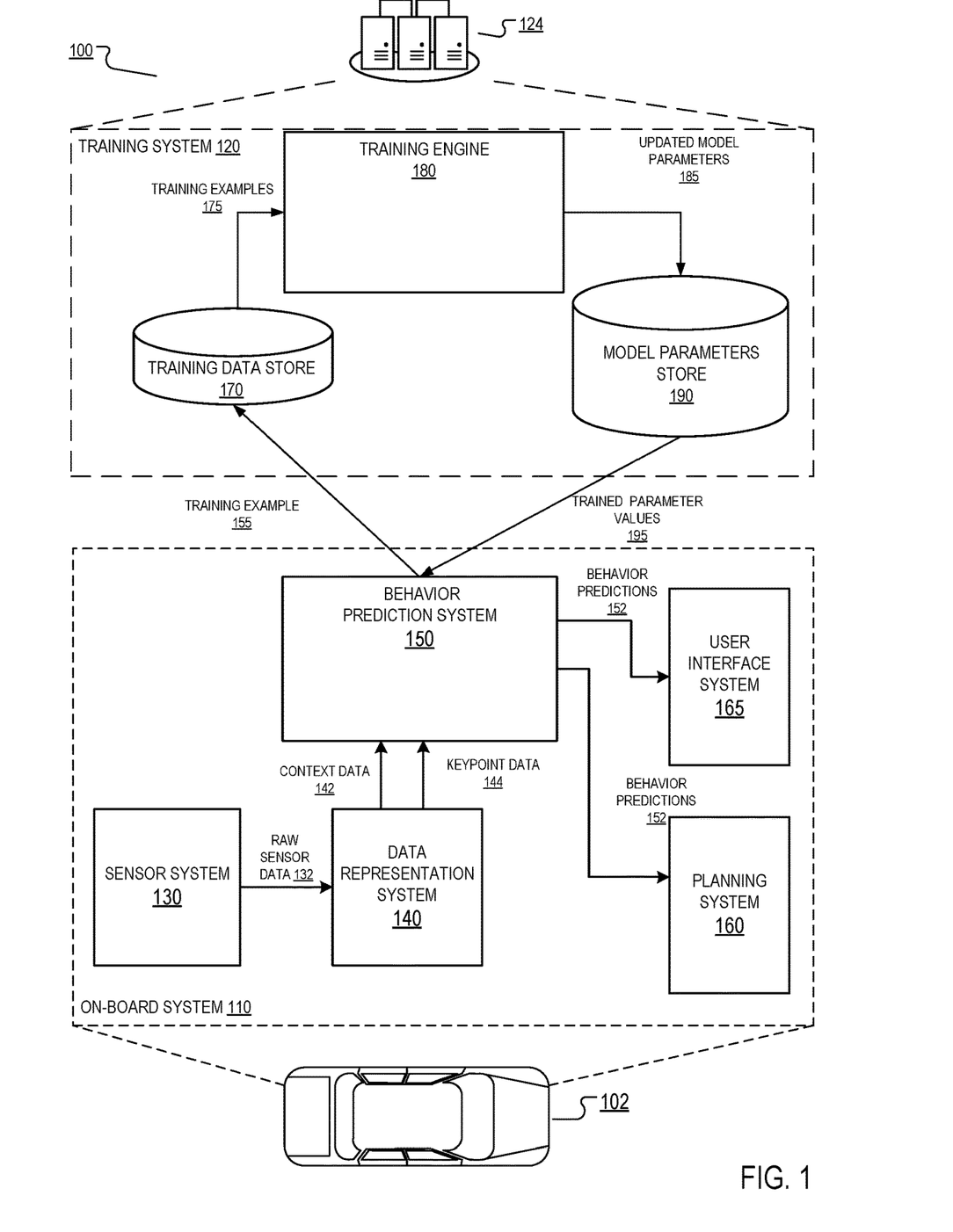
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and generates context data 142. The context data 142 characterizes the current state of the environment surrounding the vehicle 102 as of the current time point.

For example, the context data 142 can characterize, for all surrounding agents in the environment, a current state at the current time point and a previous state at one or more respective previous time points. In other words, the scene data can include, for all surrounding agents in the environment, data that characterizes a previous trajectory of the agent in the environment up to the current time point. The state of an agent at a time point can include the location of the agent at the time point and, optionally, values for a predetermined set of motion parameters at the time point. As a particular example, the motion parameters can include a heading for the agent, a velocity of the agent, and/or an acceleration of the agent.

The context data 142 can also include data characterizing a current state of the vehicle 102 at the current time point and a previous state of the vehicle at one or more respective previous time points.

In some implementations, the context data 142 also includes roadgraph data characterizing road elements in the scene, e.g., lanes, traffic signals, traffic signs, and so on. These features can include (i) dynamic features of the environment, e.g., traffic light states at the current time point, (ii) static features of the environment, e.g., road graph data characterizing one or more of lane connectivity, lane type, stop lines, speed limits, and so on, or (iii) both.

The data representation system 140 also generates, for each of one or more target agents, keypoint data 144 for the target agent. For example, the system 140 can generate keypoint data 144 for each human agent that is within range of one of the sensors of the vehicle or for only a specified subset of the human agents.

The keypoint data 144 for a given target agent includes, for each of a plurality of keypoints on the body of the target agent, respective three-dimensional coordinates of the keypoint at the current time point and one or more preceding time points. That is, each keypoint corresponds to a different point on the body of the target agent, e.g., a different joint or other point that has been determined to be relevant for the motion of the agent. In other words, the system 140 uses 3D, rather than 2D, keypoints that specify the locations of the keypoints in a three-dimensional coordinate system. In contrast to the 2D information, 3D human keypoints contain appearance information that is invariant to view angle and in the same coordinate system as is used for trajectory prediction.

The system 140 can generate the keypoint data 144, e.g., based on the output of a trained machine learning model that receives an input generated from sensor data, e.g., input image data, lidar data, or both, collected at a given time point and processes the data to generate estimates for the coordinates of the keypoints at the given time point. As a particular example, the system 140 can extract the keypoint data 144 from laser points generated by the lidar sensor(s) of the vehicle 102. While any appropriate keypoint extraction technique can be used, one example technique for extracting keypoint data 144 from laser points or, more generally, 3D point clouds, is described in Multi-modal 3D Human Pose Estimation with 2D Weak Supervision in Autonomous Driving, arXiv:2112.12141.

The data representation system 140 provides the context data 142 and the keypoint data 144 to a behavior prediction system 150, also on-board the vehicle 102.

For each target agent, the behavior prediction system 150 processes the context data 142 and the keypoint data 144 for the target agent using one or more neural network components to generate a behavior prediction 152 for the target agent. At a high level, the neural network components can include respective encoder neural networks for the context data 142 and the keypoint data 144 and one or more decoder neural networks that generate the behavior prediction 152 from the outputs of the encoder neural networks.

Each behavior prediction is a prediction of the behavior of the target agent starting from a current time point. In some implementations, the behavior prediction includes (i) a crossing action prediction, (ii) a trajectory prediction, or (iii) both.

A crossing action prediction is a score that represents the likelihood that the target agent is currently crossing a roadway in the environment, i.e., performing a crossing action.

A trajectory prediction is a prediction that defines the future trajectory of the corresponding target agent starting from a current time point.

Thus, the behavior prediction system 150 incorporates the keypoint data 144 into generating the behavior prediction 152 in order to generate more accurate behavior predictions, i.e., more accurate predictions than could be generated using only the context data 142.

Generating the behavior predictions 152 will be described in more detail below with reference to FIGS. 2 and 3.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the behavior predictions 152 generated by the behavior prediction system 150 to one or more other on-board systems of the vehicle 102, e.g., the planning system 160 and/or a user interface system 165.

When the planning system 160 receives the behavior predictions 152, the planning system 160 can use the behavior predictions 152 to generate planning decisions that plan a future trajectory of the vehicle, i.e., to generate a new planned vehicle path. For example, the behavior predictions may contain a prediction that a particular surrounding agent is likely crossing a roadway that the vehicle is traveling on. In this example, the planning system 160 can generate a new planned vehicle path that yields to the surrounding agent to allow the surrounding agent to finish crossing the roadway. As another example, the behavior predictions may contain a prediction that the future trajectory of the particular surrounding agent will take the surrounding agent close to the edge of the roadway. In this example, the planning system 160 can generate a new planned vehicle path that reduces the speed of the vehicle to allow the vehicle to yield if the surrounding agent enters the roadway.

When the user interface system 165 receives the behavior prediction outputs 152, the user interface system 165 can use the behavior predictions 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the behavior predictions 152 may contain a prediction that a particular surrounding agent is likely crossing the roadway in front of the vehicle 102. In this example, the user interface system 165 can present an alert message to the driver of the vehicle 102 with instructions to adjust the trajectory of the vehicle 102 to allow the agent to cross or notifying the driver of the vehicle 102 that a human is in the roadway.

To generate the behavior predictions 152, the behavior prediction system 150 can use trained parameter values 195, i.e., trained model parameter values of the neural network components of the behavior prediction system 150, obtained from a behavior prediction model parameters store 190 in the training system 120.

The training system 120 is typically hosted within a data center 124, which can be a distributed computing system having hundreds or thousands of computers in one or more locations.

The training system 120 includes a training data store 170 that stores training data used to train the behavior prediction system i.e., to determine the trained parameter values 195 of the neural network components of the behavior prediction system 150. The training data store 170 receives raw training examples from, e.g., agents operating in the real world, from computer simulations of the real-world, or one or more computer programs that generate synthetic navigation scenarios by modifying real-world data.

For example, the training data store 170 can receive a raw training example 155 from the vehicle 102 and one or more other agents that are in communication with the training system 120. The raw training example 155 can be processed by the training system 120 to generate a new training example. The raw training example 155 can include context data and keypoint data for a target agent, i.e., like the scene data 142 and the keypoint data 144, that can be used as input for a new training example. The raw training example 155 can also include outcome data characterizing the state of the environment surrounding the vehicle 102 at one or more future time points. This outcome data can be used to generate ground truth behavior predictions for the target agent. For example, the outcome data can be used to determine whether the target agent was crossing a roadway at the last time point in the context data. As another example, the outcome data can be used to determine a ground truth trajectory for the target agent. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points.

The training data store 170 provides training examples 175 to a training engine 180, also hosted in the training system 120. The training engine 180 uses the training examples 175 to update model parameters that will be used by the behavior prediction system 150, and provides the updated model parameters 185 to the behavior prediction model parameters store 190. Once the parameter values of the behavior prediction system 150 have been fully trained, the training system 120 can send the trained parameter values 195 to the behavior prediction system 150, e.g., through a wired or wireless connection.

Training the behavior prediction system 150 is described in more detail below with reference to FIG. 4.

Figure 2:
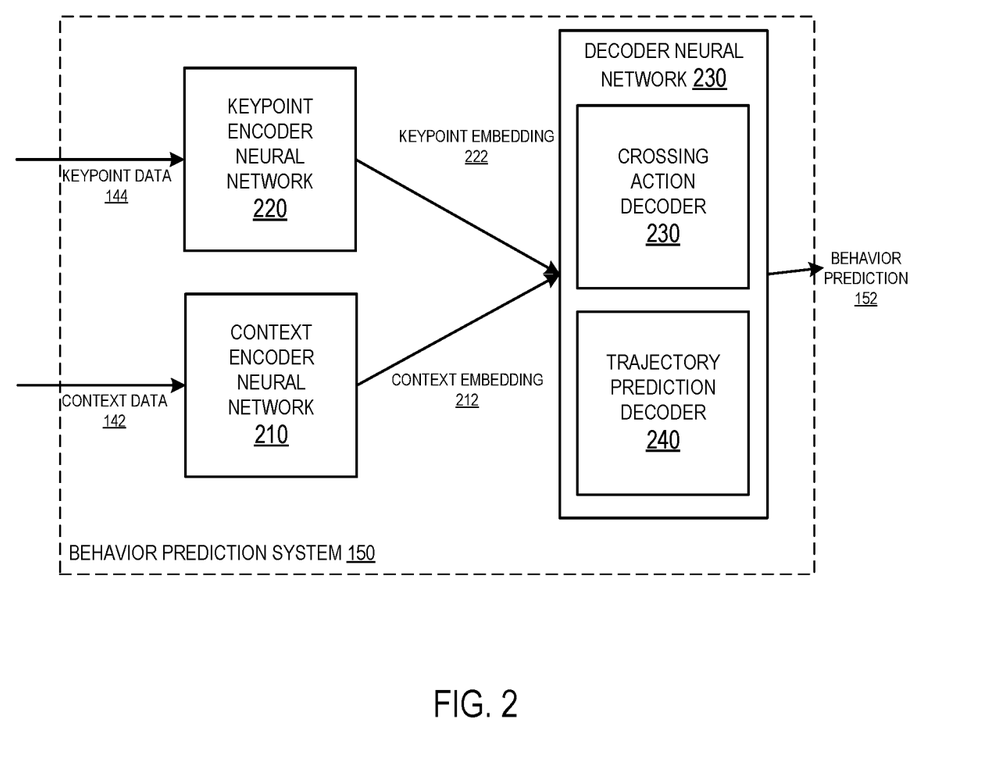
FIG. 2 shows the operation of the behavior prediction system to generate a behavior prediction for a target agent.

FIG. 2 shows an example of the operation of the behavior prediction system 150 to generate a behavior prediction for a target agent.

As shown in FIG. 2, the behavior prediction system 150 includes a context data encoder neural network 210, a keypoint encoder neural network 220, and one or more decoder neural networks 230.

To generate a behavior prediction, the system 150 obtains data characterizing a scene in an environment that includes a plurality of agents at a current time point. The agents include the target agent for which the behavior prediction will be generated and one or more context agents, i.e., agents whose behavior may influence the behavior of the target. The context agents can include other humans, other vehicles, or both.

For example, the data characterizing the scene can include data generated from sensor data captured by the sensors of the autonomous vehicle.

More specifically, the data includes context data 142 that includes data characterizing historical trajectories of the plurality of agents up to the current time point. The context data can also include roadgraph data characterizing road elements in the scene, e.g., lanes, traffic signals, traffic signs, and so on.

The data also includes keypoint data 144 for the target agent. The keypoint data includes, for each of a plurality of keypoints on the body of the target agent, respective three-dimensional coordinates of the keypoint at the current time point and one or more preceding time points. That is, each keypoint corresponds to a different point on the body of the target agent, e.g., a different joint or other point that has been determined to be relevant for the motion of the agent. By making use of three-dimensional (3D) keypoints rather than 2D keypoints, the system can effectively leverage the view invariant appearance information that is available from 3D keypoints that is not available from 2D keypoints. The appearance information can provide useful cues for motion prediction, especially when the agent is performing special activities (e.g., bending down, waving hands) or interacting with objects (e.g., pushing a cart, riding a scooter).

As described above, the keypoint data can be generated, e.g., based on the output of a trained machine learning model that receives as input image data, lidar data, or both at a given time point and process the data to generate estimates for the coordinates of the keypoints at the given time point.

The system 150 processes the context data 142 using the context data encoder neural network 210 to generate a context embedding 212 for the target agent and processes the keypoint data 144 using the keypoint encoder neural network 220 to generate a keypoint embedding 222 for the target agent.

The context data encoder neural network 210 can have any appropriate architecture that allows the neural network 210 to map the context data 142 to the context embedding 212, i.e., to a tensor, e.g., a vector or a matrix, of numeric values having a specified dimensionality.

As one example, the system can obtain or represent the context data 142 as a rasterized top-down view image of the environment. In this example, the context data encoder neural network 210 can be a convolutional neural network or a vision Transformer neural network that maps the top-down view image to the context embedding 212.

As another example, the system can obtain or represent the context data 142 as a vectorized representation. That is, the system can represent the roadgraph data and the trajectories of context traffic participants which may have interactions with the target agent as respective sets of vectors. In this example, the neural network 210 uses the vectorized representation to generate, for each road element and each agent, a respective embedding and then processes the respective embeddings for each road element and each agent to generate an updated embedding for at least the target agent. The neural network 210 then uses, as the context embedding 212 for the target agent, the updated embedding for the target agent generated by the context encoder neural network.

More specifically, the roadgraph (lanes, traffic signs) and trajectories are transformed into polylines with a variable number of vectors respectively. Each polyline is used to construct a subgraph where each node represents a certain vector within the polyline. Next, the polyline subgraphs are used to construct a fully-connected global interaction graph and the context encoder neural network 210 applies multiple rounds of message passing to model the agent-agent and agent-road interactions between the scene elements and to generate a global context embedding for each modeled agent. The neural network 210 then selects, as the context embedding 212, the global context embedding for the target agent.

The keypoint encoder neural network 220 can have any appropriate architecture that allows the neural network 220 to map the keypoint data 244 to the keypoint embedding 222, i.e., to a tensor, e.g., a vector or a matrix, of numeric values having a specified dimensionality.

As a particular example, to allow the neural network 220 to model the spatial and temporal relationships between the keypoints, the neural network 220 can represent the keypoint data 244 as a spatio-temporal graph.

More specifically, the neural network 220 can generate graph data representing a spatio-temporal graph of the keypoint data 244. The spatio-temporal graph has nodes that represent keypoints, spatial edges that represent spatial relationships between keypoints on the body of the target agent, and temporal edges that represent connections between the same keypoint at different time points.

The neural network 220 can then process the graph data using a neural network that is configured to process spatio-temporal graph data to generate a feature tensor and then generate the keypoint embedding 222 for the target agent from the feature tensor. For example, the feature tensor can reflect both spatial and temporal patterns in the keypoint data at one or more scales. One example of such a neural network is a spatio-temporal graph convolutional neural network. Spatio-temporal graph convolutional neural networks are described in more detail in Spatial Temporal Graph Convolutional Networks for Skeleton-Based Action Recognition, available at arXiv:1801.07455. Another example of such a neural network is a spatio-temporal Transformer. Spatio-temporal Transformers are described in more detail in Spatial Temporal Transformer Network for Skeleton-based Action Recognition, available at arXiv:2012.06399.

As a particular example, the neural network 220 can apply a dimensionality reducing operation to the feature tensor to reduce the feature tensor to have the dimensionality required for the keypoint embedding 222. The operation can be, e.g., a global average pooling operation.

The system 150 generates a combined embedding for the target agent from the context embedding 212 and the keypoint embedding 214 and processes the combined embedding using the decoder neural network 230 to generate a behavior prediction 152 for the target agent that characterizes predicted behavior of the target agent after the current time point.

The system can generate the combined embedding from the context embedding 212 and the keypoint embedding 214 in any of a variety of ways.

As one example, the system can concatenate the context embedding 212 and the keypoint embedding 214 to generate the combined embedding.

As another example, the system can sum or average the context embedding 212 and the keypoint embedding 214 to generate the combined embedding.

As another example, the system can process the context embedding 212, the keypoint embedding 214, or both using one or more neural network layers and then generate the combined embedding from the output of the neural network layers.

As described above, in some cases, the behavior prediction output 152 includes both a crossing action prediction and a trajectory prediction for the target agent.

In these cases, the decoder neural network 230 includes a crossing action decoder neural network 240 and a trajectory prediction decoder neural network 250. When the behavior prediction output 152 includes only one of the crossing action prediction or the trajectory prediction, the decoder neural network 230 can include only the corresponding one of the crossing action decoder 240 or the trajectory prediction decoder 250.

When a crossing action prediction is to be generated, the system 150 processes the combined embedding using the crossing action decoder neural network 240 to generate the crossing action prediction. The crossing action prediction 240 includes a crossing score that represents a likelihood that the target agent is crossing a roadway in the environment at the current time point. For example, the crossing action prediction 240 can include only the crossing score or can include one or more additional scores, e.g., a score that represents the likelihood that the agent is not crossing, one or more other scores that correspond to other possible crossing behaviors, or both. As a particular example, the crossing agent decoder neural network 240 can be a multi-layer perceptron (MLP) that processes the combined embedding to generate the crossing action prediction neural network.

When a trajectory prediction is to be generated, the system 150 processes the combined embedding using the trajectory prediction decoder neural network 240 to generate the trajectory prediction. The system can generate the trajectory prediction in any of a variety of ways, i.e., by using any of a variety of trajectory prediction decoders.

For example, the trajectory prediction decoder neural network 240 can make use of a "target-driven" trajectory prediction approach. In this approach, for each of a plurality of candidate locations in the environment, the decoder 240 is configured to process data specifying the candidate location and the combined embedding to generate a predicted trajectory for the target agent given that the target agent intends to navigate to the candidate location. As a particular example, the decoder 240 can select a first set of initial candidate locations in the environment, e.g., randomly or by sampling points along the roadgraph or along a fixed grid, and then score each of the points using the context embedding. The decoder 240 can then select a fixed number of highest scoring initial locations as the plurality of candidate locations. Alternatively, the decoder 240 can use all of the initial locations as the plurality of candidate locations, without performing the scoring. The decoder 240 is then configured to process at least the predicted trajectory (and, optionally, one or more of: the combined embedding, the context data, or the keypoint data) to generate a score for the predicted trajectory that represents the likelihood that the target agent will follow the predicted trajectory. Thus, in these cases, the trajectory prediction includes a set of predicted trajectories and a score for each predicted trajectory.

As another example, the decoder 240 can be a Multi-Path decoder that generates the trajectory prediction as the parameters of a probability distribution, e.g., a Gaussian mixture model, over the space of possible future trajectories for the target agent.

As another example, the decoder 240 can be an MLP or a recurrent neural network that directly regress the states of the future trajectory, i.e., that processes the combined embedding to regress a respective predicted future state for each future time point in the future trajectory for the target agent.

Figure 3:
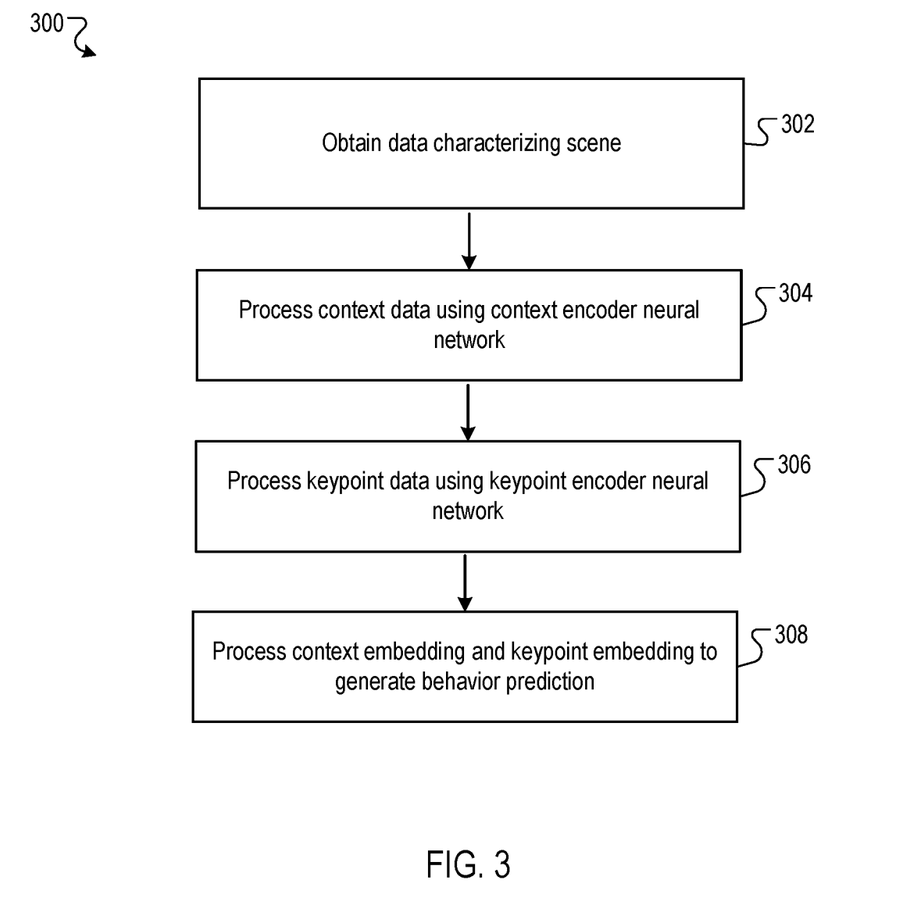
FIG. 3 is a flow diagram of an example process for generating a behavior prediction.

FIG. 3 is a flow diagram of an example process 300 for generating a behavior prediction for a target agent in the vicinity of the vehicle. For convenience, the process 300 will be described as being performed by a system of one or more computers located in one or more locations. For example, a behavior prediction system, e.g., the behavior prediction system 150 of FIG. 1, appropriately programmed in accordance with this specification, can perform the process 300.

In particular, the system performs the process 300 to generate a respective behavior prediction for each of one or more target agents that are in the vicinity of the vehicle. An agent being in the vicinity of the vehicle refers to the agent being within range of one or more of the sensors of the vehicle.

The system obtains data characterizing a scene in an environment that includes a plurality of agents at a current time point (step 302). The agents include the target agent for which the behavior prediction will be generated and one or more context agents, i.e., agents whose behavior may influence the behavior of the target.

For example, the data characterizing the scene can include data generated from sensor data captured by the sensors of the autonomous vehicle.

More specifically, the data includes context data that includes data characterizing historical trajectories of the plurality of agents up to the current time point. The context data can also include roadgraph data characterizing road elements in the scene, e.g., lanes, traffic signals, traffic signs, and so on.

The data also includes keypoint data for the target agent. The keypoint data includes, for each of a plurality of keypoints on a body of the target agent, respective three-dimensional coordinates of the keypoint at the current time point and one or more preceding time points. That is, each keypoint corresponds to a different point on the body of the target agent, e.g., a different joint or other point that has been determined to be relevant for the motion of the agent. The keypoint data can be generated, e.g., based on the output of a trained machine learning model that receives as input image data, lidar data, or both at a given time point and process the data to generate estimates for the coordinates of the keypoints at the given time point.

The system processes the context data using a context data encoder neural network to generate a context embedding for the target agent (step 304) and processes the keypoint data using a keypoint encoder neural network to generate a keypoint embedding for the target agent (step 306).

The system then processes the context embedding and the keypoint embedding to generate the behavior prediction for the target agent (step 308).

As described above, prior to using the components of the behavior prediction system, i.e., the context encoder neural network, the candidate encoder neural network, and the decoder neural network, the training system trains these components so that the behavior prediction system can accurately generate behavior predictions given a set of context data and a set of keypoint data.

In particular, the training system trains the components on a set of training examples. Each training example includes at least context data and keypoint data for a given agent as of a first time point and a ground truth behavior prediction output for the given agent after the first time point. For example, when the system generates both a crossing action prediction and a trajectory prediction, each training example includes (i) a ground truth crossing action output that indicates whether the given agent was crossing at the first time point and (ii) a ground truth agent trajectory for the agent that identifies the actual trajectory followed by the agent after the first time point.

The system trains the components on training data to minimize a loss function that measures errors in behavior predictions relative to the corresponding ground truth behavior prediction output.

For example, when the system generates both a crossing action prediction and a trajectory prediction, the loss function includes a first loss that measures an error between the crossing action prediction and the ground truth crossing action output and a second loss that measures an error between the trajectory prediction and the ground truth agent trajectory for the agent that identifies the actual trajectory followed by the agent after the first time point. For example, the first loss can be a cross-entropy loss between the crossing action prediction and the ground truth crossing action output. The second loss can be made up of one or more trajectory prediction error terms, the structure of which depends on the type of trajectory prediction decoder that is used by the system. As a particular example, when the system uses target-driven trajectory prediction, the second loss can include one term that measures errors in the future trajectories given the ground truth trajectory output and another term that measures errors in the scores assigned to the future trajectories given the ground truth trajectory output. As another example, when the system generates parameters of a probability distribution over the space of possible trajectories, the second loss can include a term that measures the probability assigned to the ground truth trajectory by the probability distribution. As yet another example, when the system directly regresses a predicted trajectory, the second loss can include a term, e.g., a mean squared error loss term, that measures the error between the predicted trajectory and the ground truth trajectory.

In other words, the training system trains the decoder neural network, the context data encoder neural network, and the keypoint encoder neural network jointly on an objective function, e.g., a loss function, that includes one or more terms that measure errors in crossing action predictions and one or more terms that measure errors in trajectory predictions.

In some implementations, the loss function is a weighted sum between the first and second losses.

In some other implementations, the loss function also includes a respective auxiliary loss for each of one or more auxiliary tasks. These losses and tasks are referred to as "auxiliary" because they are used during training to improve the training of the components of the behavior prediction systems but are not used after training is completed. That is, the predictions corresponding to these "auxiliary" losses and tasks are not used after training, i.e., when making predictions on-board the vehicle.

One example of an auxiliary task that the training system can use to improve the training of the components of the behavior prediction system is a keypoint prediction task. This task aims to infer future keypoint locations based on a sequence of history observations, which requires more fine-grained understanding on human pose dynamics than trajectory prediction.

When this task is used, the system also makes use of an auxiliary decoder head (a "keypoint prediction head") during training. The keypoint prediction head is a neural network, e.g., an MLP, which takes as input the keypoint embedding and that is configured to generate respective predicted keypoint coordinates for each of the keypoints of the target agent at one or more future time steps. In this example, the auxiliary loss for this task is a loss that measures errors between the predicted future keypoint locations and the ground truth future keypoint locations. For example, the system can use a mean-squared error loss across the future time points identified in the training example. Thus, during training, the system processes the keypoint embedding using the keypoint prediction head to generate respective predicted keypoint coordinates for each of the keypoints at one or more future time steps and trains the keypoint prediction head and the keypoint encoder based on the error between the respective predicted keypoint coordinates and ground truth coordinates for each of the keypoints at the one or more future time steps. During training, the system can backpropagate gradients through the keypoint prediction head and into the keypoint encoder neural network to improve the representations generated by the keypoint encoder neural network.

Figure 4:
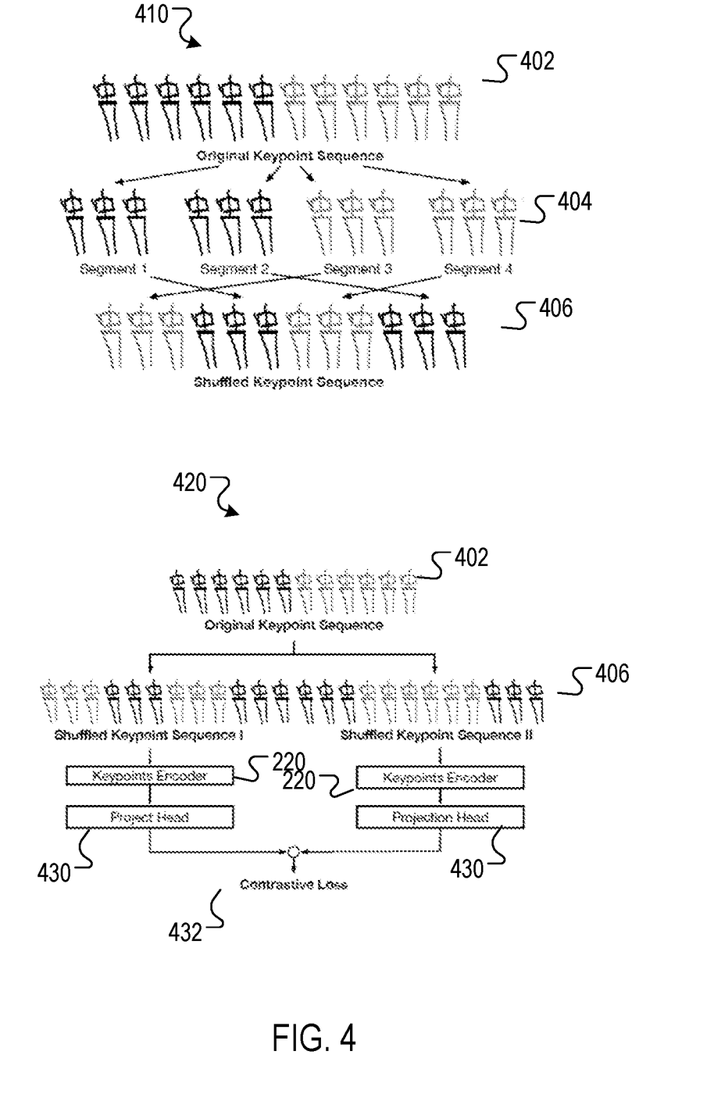
FIG. 4 shows two example auxiliary tasks for improving the training of the behavior prediction system.

Two additional examples of auxiliary tasks are illustrated in FIG. 4.

FIG. 4 shows two examples of auxiliary tasks for improving the training of the behavior prediction system.

The first example shown in FIG. 4 is a keypoint jigsaw puzzle auxiliary task 410. The goal of solving this task is to identify the correct permutation of a given keypoint sequence 402 in which subsequences ("segments") are randomly shuffled. Incorporating this task encourages the keypoint encoder to learn temporal relations among different temporal segments of keypoint data.

To perform this auxiliary task during training, the system generates shuffled keypoint data 406 by applying a random shuffling operation to the keypoint data 402. For example, as shown in FIG. 4, the system can divide the time points in the input keypoint data into segments 404 and then randomly shuffle, i.e., by applying a randomly selected shuffling operation from a set of possible shuffling operations, the order of the segments 404 within the input keypoint data. In some implementations, instead of shuffling the original coordinates of the keypoint sequences, the system fixes the center location of human skeletons at each frame and only shuffles the relative coordinates of keypoints with respect to the skeleton center. This can encourage the model to capture subtle patterns of human pose dynamics and avoid the shortcut of just capturing the change of center locations for the inference of the correct permutation.

The system then processes the shuffled keypoint data 406 using the keypoint encoder neural network to generate a shuffled keypoint embedding.

The system then processes the shuffled keypoint embedding using the auxiliary decoder head corresponding to this auxiliary task, i.e., that is configured to generate a probability distribution that includes a respective probability for each of a plurality of possible shuffling operations that represents a likelihood that the possible shuffling operation was applied to the keypoint data to generate the shuffled keypoint data. The auxiliary decoder head can be, e.g., an MLP. In the example of FIG. 4, each possible shuffling operation can correspond to a different permutation of the segments of the keypoint data.

The system then trains the auxiliary decoder head and the keypoint encoder based on a keypoint jigsaw puzzle loss, e.g., an error between the probability distribution and a target distribution that identifies the applied random shuffling operation as the shuffling operation that was applied to the keypoint data. For example, the keypoint jigsaw puzzle loss can be a cross-entropy loss between the probability distribution and the target distribution. During training, the system can backpropagate gradients through the auxiliary decoder head and into the keypoint encoder neural network to improve the representations generated by the keypoint encoder neural network.

The second example shown in FIG. 4 is a keypoint contrastive learning task 420. The goal of this task is to cause the model to learn high-level temporal similarity among keypoint sequences.

To perform this task during training, the system generates a plurality of different shuffled keypoint data by applying a plurality of different random shuffling operations to the keypoint data 402, e.g., as described above. As shown in FIG. 4, the system generates two different shuffled keypoint data 406.

The system then processes the plurality of different shuffled keypoint data 406 using the keypoint encoder neural network 220 to generate a respective shuffled keypoint embedding for each shuffled keypoint data 406. In particular, as shown in FIG. 2, the system generates two different shuffled keypoint embeddings for the two different shuffled keypoint data.

The system then trains the keypoint encoder neural network 220 on a contrastive learning objective ("contrastive loss") 432 that measures similarities between the respective shuffled keypoint embeddings and shuffled keypoint embeddings for shuffled keypoint data generated from keypoint data for other target agents.

As shown in FIG. 4, the system uses a projection head 430 to project each keypoint embedding into the feature space in which the contrastive loss is applied and then applies the contrastive loss on the output embeddings generated by the projection head 430. The projection head 430 is a neural network, e.g., an MLP. The system can use any appropriate contrastive loss that encourages keypoint embeddings of shuffled keypoint embeddings generated from keypoint data for the same target to be more similar to each other than to shuffled keypoint embeddings generated from keypoint data for other target agents. For example, the system can use a cosine similarity—based contrastive learning loss, e.g., the simCLR loss or a different contrastive learning loss.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
obtaining data characterizing a scene in an environment that includes a plurality of agents at a current time point, the plurality of agents including a target agent and one or more context agents, wherein each of the plurality of agents is an agent in the vicinity of an autonomous vehicle in an environment, the data comprising:
(i) context data, the context data comprising data characterizing historical trajectories of the plurality of agents up to the current time point;
(ii) keypoint data for the target agent, the keypoint data comprising, for each of a plurality of three-dimensional (3D) keypoints on a body of the target agent, respective three-dimensional coordinates of the 3D keypoint at the current time point and one or more preceding time points, wherein each of the plurality of 3D keypoints corresponds to a different point on the body of the target agent that is relevant to a motion of the target agent;
processing the context data using a context data encoder neural network to generate a context embedding for the target agent;
processing the keypoint data using a keypoint encoder neural network to generate a keypoint embedding for the target agent;
generating a combined embedding for the target agent from the context embedding and the keypoint embedding;
processing the combined embedding using a decoder neural network to generate a behavior prediction output for the target agent that characterizes predicted behavior of the target agent after the current time point; and
controlling the autonomous vehicle to take a planned path based on the behavior prediction output for the target agent.

2. The method of claim 1, wherein the decoder neural network comprises a crossing action decoder neural network, and wherein processing the combined embedding using a decoder neural network to generate a behavior prediction output comprises:
processing the combined embedding using the crossing action decoder neural network to generate a crossing action prediction that includes a crossing score that represents a likelihood that the target agent is crossing a roadway in the environment at the current time point.

3. The method of claim 1, wherein the decoder neural network comprises a trajectory prediction decoder neural network, and wherein processing the combined embedding using a decoder neural network to generate a behavior prediction output comprises:
processing the combined embedding using the trajectory prediction decoder neural network to generate a trajectory prediction that defines a predicted future trajectory of the target agent after the current time point.

4. The method of claim 1, wherein the decoder neural network comprises a crossing action decoder neural network and a trajectory prediction decoder neural network, and wherein processing the combined embedding using a decoder neural network to generate a behavior prediction output comprises:
processing the combined embedding using the crossing action decoder neural network to generate a crossing action prediction that includes a crossing score that represents a likelihood that the target agent is crossing a roadway in the environment at the current time point; and
processing the combined embedding using the trajectory prediction decoder neural network to generate a trajectory prediction that defines a predicted future trajectory of the target agent after the current time point.

5. The method of claim 4, wherein the decoder neural network, the context data encoder neural network, and the keypoint encoder neural network have been trained jointly on an objective function that includes one or more terms that measure errors in crossing action predictions and one or more terms that measure errors in trajectory predictions.

6. The method of claim 4, wherein the trajectory prediction decoder neural network is configured to:
for each of a plurality of candidate locations in the environment, process the candidate location and the combined embedding to generate a predicted trajectory for the target agent given that the target agent intends to navigate to the candidate location; and
for each predicted trajectory, process at least the predicted trajectory to generate a score for the predicted trajectory that represents a likelihood that the target agent will follow the predicted trajectory.

7. The method of claim 4, wherein the context data further comprises roadgraph information characterizing road elements in the scene in the environment at the current time point.

8. The method of claim 7, wherein the context encoder neural network is configured to:
generate, for each road element and each agent, a respective embedding; and
process the respective embeddings for each road element and each agent to generate an updated embedding for at least the target agent, wherein the context embedding for the target agent is the updated embedding for the target agent generated by the context encoder neural network.

9. The method of claim 1, wherein processing the keypoint data using a keypoint encoder neural network to generate a keypoint embedding for the target agent comprises:
generating graph data representing a spatio-temporal graph of the keypoint data, the spatio-temporal graph having nodes representing keypoints, spatial edges representing spatial relationships between keypoints on the body of the target agent, and temporal edges representing connections between the same keypoint at different time points;
processing the graph data using a spatio-temporal graph convolutional neural network to generate a feature tensor; and
generating the keypoint embedding for the target agent from the feature tensor.

10. The method of claim 9, wherein generating the keypoint embedding for the target agent from the feature tensor comprises:
applying global average pooling to the feature tensor to generate the keypoint embedding.

11. The method of claim 1, wherein generating a combined embedding for the target agent from the context embedding and the keypoint embedding comprises:
concatenating the context embedding and the keypoint embedding.

12. The method of claim 1, wherein the context data and the keypoint data comprises data generated from data captured by one or more sensors of the autonomous vehicle.

13. The method of claim 12 further comprising: providing (i) the trajectory predictions for the one or more target agents, (ii) data derived from the trajectory predictions for the one or more target agents, or (iii) both to an on-board system of the autonomous vehicle for use in controlling the autonomous vehicle.

14. The method of claim 1, further comprising:
generating shuffled keypoint data by applying a random shuffling operation to the keypoint data;
processing the shuffled keypoint data using the keypoint encoder neural network to generate a shuffled keypoint embedding;
processing the shuffled keypoint embedding using a first auxiliary decoder head that is configured to generate a probability distribution comprising a respective probability for each of a plurality of possible shuffling operations that represents a likelihood that the possible shuffling operation was applied to the keypoint data to generate the shuffled keypoint data; and
training the first auxiliary decoder head and the keypoint encoder based on an error between the probability distribution and a target distribution that identifies the applied random shuffling operation as the shuffling operation that was applied to the keypoint data.

15. The method of claim 1, further comprising:
generating a plurality of different shuffled keypoint data by applying a plurality of different random shuffling operations to the keypoint data;
processing the plurality of different shuffled keypoint data using the keypoint encoder neural network to generate a respective shuffled keypoint embedding for each shuffled keypoint data; and
training the keypoint encoder based on a contrastive learning objective that measures similarities between the respective shuffled keypoint embeddings and shuffled keypoint embeddings for shuffled keypoint data generated from keypoint data for other target agents.

16. The method of claim 1, further comprising:
processing the keypoint embedding using a second auxiliary decoder head that is configured to generate respective predicted keypoint coordinates for each of the keypoints at one or more future time steps; and
training the second auxiliary decoder head and the keypoint encoder based on an error between the respective predicted keypoint coordinates and ground truth coordinates for each of the keypoints at the one or more future time steps.

17. A system comprising:
one or more computers; and
one or more storage devices storing instructions that, when executed by the one or more computers, cause the one or more computers to perform operations comprising:
obtaining data characterizing a scene in an environment that includes a plurality of agents at a current time point, the plurality of agents including a target agent and one or more context agents, wherein each of the plurality of agents is an agent in the vicinity of an autonomous vehicle in an environment, the data comprising:
(i) context data, the context data comprising data characterizing historical trajectories of the plurality of agents up to the current time point;
(ii) keypoint data for the target agent, the keypoint data comprising, for each of a plurality of three-dimensional (3D) keypoints on a body of the target agent, respective three-dimensional coordinates of the 3D keypoint at the current time point and one or more preceding time points, wherein each of the plurality of 3D keypoints corresponds to a different point on the body of the target agent that is relevant to a motion of the target agent;
processing the context data using a context data encoder neural network to generate a context embedding for the target agent;
processing the keypoint data using a keypoint encoder neural network to generate a keypoint embedding for the target agent;
generating a combined embedding for the target agent from the context embedding and the keypoint embedding;
processing the combined embedding using a decoder neural network to generate a behavior prediction output for the target agent that characterizes predicted behavior of the target agent after the current time point; and
controlling the autonomous vehicle to take a planned path based on the behavior prediction output for the target agent.

18. The system of claim 17, wherein the decoder neural network comprises a crossing action decoder neural network, and wherein processing the combined embedding using a decoder neural network to generate a behavior prediction output comprises:
processing the combined embedding using the crossing action decoder neural network to generate a crossing action prediction that includes a crossing score that represents a likelihood that the target agent is crossing a roadway in the environment at the current time point.

19. The system of claim 17, wherein the decoder neural network comprises a trajectory prediction decoder neural network, and wherein processing the combined embedding using a decoder neural network to generate a behavior prediction output comprises:
processing the combined embedding using the trajectory prediction decoder neural network to generate a trajectory prediction that defines a predicted future trajectory of the target agent after the current time point.

20. One or more non-transitory computer-readable storage media storing instructions that when executed by one or more computers cause the one or more computers to perform operations comprising:
obtaining data characterizing a scene in an environment that includes a plurality of agents at a current time point, the plurality of agents including a target agent and one or more context agents, wherein each of the plurality of agents is an agent in the vicinity of an autonomous vehicle in an environment, the data comprising:
(i) context data, the context data comprising data characterizing historical trajectories of the plurality of agents up to the current time point;
(ii) keypoint data for the target agent, the keypoint data comprising, for each of a plurality of three-dimensional (3D) keypoints on a body of the target agent, respective three-dimensional coordinates of the 3D keypoint at the current time point and one or more preceding time points, wherein each of the plurality of 3D keypoints corresponds to a different point on the body of the target agent that is relevant to a motion of the target agent;

processing the context data using a context data encoder neural network to generate a context embedding for the target agent;

processing the keypoint data using a keypoint encoder neural network to generate a keypoint embedding for the target agent;

generating a combined embedding for the target agent from the context embedding and the keypoint embedding;

processing the combined embedding using a decoder neural network to generate a behavior prediction output for the target agent that characterizes predicted behavior of the target agent after the current time point; and controlling the autonomous vehicle to take a planned path based on the behavior prediction output for the target agent.

* * * * *